Sept. 1, 1964    M. G. LOWENSTEIN    3,147,381
TWO COLOR RADIOMETER FOR DISTINGUISHING RADIATIONS
FROM SOURCES AT DIFFERENT TEMPERATURES
Filed June 30, 1961

INVENTOR.
MARK G. LOWENSTEIN
BY
Robert Elmer Morton
ATTORNEY

United States Patent Office 3,147,381
Patented Sept. 1, 1964

3,147,381
TWO COLOR RADIOMETER FOR DISTINGUISH-
ING RADIATIONS FROM SOURCES AT DIFFER-
ENT TEMPERATURES
Mark G. Lowenstein, Norwalk, Conn., assignor to Barnes
Engineering Company, Stamford, Conn., a corporation
of Delaware
Filed June 30, 1961, Ser. No. 121,218
5 Claims. (Cl. 250—83.3)

This invention relates to method and apparatus for discriminating between targets by a positive on and off method so long as the targets have radiation characteristics with respect to any kind of optical radiations, either infrared, visible, or ultraviolet which are quite distinct. The invention effects discrimination regardless of the magnitude of radiation from the objects. As will be pointed out below, it is not necessary that there be only two sources. However, in a more specific and preferred aspect this invention relates to method and apparatus for discriminating between a target of moderate temperature and a background of much higher temperature which may also be much larger in area than the relatively cooler target although this specific aspect of the invention is not limited to such situations and in fact a simplified form will be shown where both bodies are of comparable apparent size.

The problems of distinguishing between sources emitting radiations over different wavelength bands such as objects at different temperatures are old ones and there have been a number of attempts to solve these problems. In general these attempts have involved the choice of optics and detectors in two radiation bands, one corresponding to or near to the peak of radiation of the hotter object and the other corresponding or being near to the peak of the radiation of the cooler object. Except for highly colored sources the radiation patterns resemble the situation presented by black body or grey body radiation. Although, as will be pointed out below, the present invention is not in any way limited to such situations and capable of handling discrimination even where the two bodies are not pure black or grey bodies, it will simplify the discussion of the problem and of the general method of solution by assuming that the bodies radiate approximately as black or grey bodies. The shape of the curves are quite similar, the black body having higher energy at all points than the grey body which does not have as high emissivity.

In general as the temperature of the radiator goes up the wavelength of maximum energy shifts to the shorter wavelength region but this does not mean that the hotter body does not radiate at longer wavelengths. It does and in fact the radiation will frequently be more intense than the cooler body because the intensity of radiation for different black or grey bodies varies as the fourth power of the temperature, in degrees Kelvin. Thus the hotter body will radiate both at shorter wavelengths nearer its radiation peak and also at the longer wavelengths near the radiation peak of the cooler body, and the radiation at this longer wavelength may be, and often is, actually greater than that of the cooler body. However, when we consider the relative radiations an entirely different picture is presented. The cooler body radiates hardly at all at the short wavelength corresponding to peak radiation of the hot body and therefore the ratio of its radiation at the long wavelengths to its radiation at the short wavelengths is very much greater. This has been utilized in one method of discrimination which for radiations which are all in the infrared is described as an airplane anticollision device in the Shimukonis et al. Patent No. 2,927,212 and which is intended to discriminate between sunlit clouds and a mountain peak or another airplane. Two detectors are used, one for each wavelength range and the outputs amplified if necessary. Then the instrument is nulled by exposing it only to radiations from the body of higher color temperature. In other words, the response at the two different wavelengths for the hotter body oppose each other and are equal. This usually requires a very marked attenuation of the shorter wavelength detector either optically, electronically or both. Then when the instrument sees both the cloud and the cooler target there will be a net output which is due only or practically only to radiation from the cooler body.

Under very favorable circumstances this system is capable of satisfactory operation, however, it is open to two serious drawbacks. The first is that there is a nulling of two relatively strong radiation signals. In order to permit the detection of a much weaker radiation the accuracy of the balancing of two large quantities must be extremely high and it is always limited by the magnitude of the quantities. A more serious drawback arises when extraneous effects intervene. Let us assume that the cloud of Shimukonis has a color temperature of about 6,000° K. Peak radiation would be in the visible spectrum and in addition there will still be extensive radiation in the near infrared. If the cooler body has a color temperature of say 2,000° K. (the exhaust of the other airplane), its peak radiation will be in the infrared with negligible radiation in the visible.

Now let us assume that the initial nulling of the instrument under influence of radiation from the source of higher color temperature took place when the path from the source to the instrument did not have any substantial selective absorption, for example, the source, such as a cloud, might be viewed on a clear day. If then the instrument were used under conditions, for example haze, in which there was a considerable attenuation of radiations in the visible spectrum and much less in the infrared the response of the instrument would be exactly the same as if it saw the cooler source. In other words, there would be a false indication. Unless nulling is repeated just before making each observation, normally an impractical procedure, the instrument is entirely unreliable.

The present invention is almost completely insensitive to variations in attenuation and in intrinsic brightness of the sources. At the same time this greatly increased reliability and improved accuracy is obtained in a simple instrument in which the electronic circuits are actually as simple or in certain circumstances even more simple than in the methods and apparatus which have been used before. This is somewhat unusual as ordinarily an improved result is obtained only at the expense of more elaborate or more expensive equipment. Fortunately in the present case improved results can be obtained without additional cost and in some cases actually with a cheaper and simpler instrument.

There are two modifications of the present invention. One modification allows reliable detection of a small source at a lower color temperature even in the presence of relatively large areas of a higher color temperature. The second variation, which is simpler and uses fewer elements, is capable of effective use where the relative dimensions of the two sources are comparable, for example, when both are sufficiently distant so that for practical purposes they constitute point sources.

In both modifications there is a positive shutting off of any response when a given threshold value is reached in the signal from the shorter wavelength detector. There is no question of balance and no question of changed response with changed path attenuation. In the case of the first variation any radiation at the shorter wavelength switches off the electronic circuits through which radiation detector response of the longer wavelengths pass. In the second variation where the sources are of the same size as in the case of two point sources half as many detectors are used and simpler electronics are possible, the shorter wavelength radiation response is suppressed. In both cases we are dealing with a sharp cutoff when a certain set of conditions is reached. The reliability is much greater than a balancing or nulling even under favorable circumstances and completely eliminates any false responses when there is a change in the attenuation of the path of the radiation. When discrimination between more than two sources of different radiation characteristics is desired, some changes in electronics are often needed although still using standard types of electronic circuits. As the electronic modifications can best be understood after a full description of the preferred modification, this description of the modifications will be found at the end of the specification.

The detectors for each wavelength range receive radiation of the bands chosen, and usually through separate optical systems. The optics, however, are conventional and are not affected by the present invention except, of course, that they must be suitable for the wavelength of the radiation in question. Accordingly, no optics will be shown in the drawings of the present invention. The nature of the radiation detectors also does not depart from good standard radiation detector practice, again with the proviso that, of course, the detectors must be suitable for the wavelength of radiation in question. In the drawings the detectors are diagrammatically shown and the invention is not intended to be limited to the particular type illustrated. It is an advantage of the present invention that no particular special form of radiation detector is needed and standard equipment may be utilized.

The electronic circuits which, for two source discrimination preferably include some differentiation, are also of standard types. The invention lies in the new organization and combination of elements rather than in any novelty of any particular element taken by itself.

The invention will be illustrated in greater detail in conjunction with the detection of a 2,000° K. source in the presence of 6,000° K. background or competing source and in connection with the drawings in which.

Figure 1:
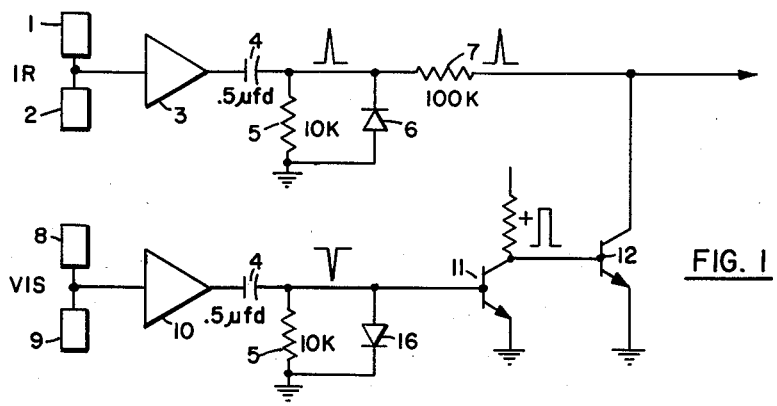
FIG. 1 is a diagrammatic illustration, partially an electronic schematic, of an instrument for detecting a small lower temperature object in the presence of larger high temperature objects.

In FIG. 1 the problem, as above stated, is to distinguish or detect a relatively cooler source, for example 2,000° K. in the presence of a background of a color temperature of 6,000° K. which may be much larger in extent. Two scanning optical systems (not shown), cause radiation to be concentrated on two detectors. One detector, labelled IR, comprises two lead sulfide cells 1 and 2 in a bridge circuit. The optics are designed to pass a band in the vicinity of 1.5μ which corresponds to the wavelength of maximum radiation of a 2,000° K. source. The output of the detector is amplified in a preamplifier 3 and then passes through a circuit which differentiates the signal and suppresses negative pulses. This circuit is composed of a capacitor 4 and resistor 5 and a suitably oriented diode 6. The positive pulse form is shown at the side of the circuit. The output passes through a resistor 7 to suitable readout mechanisms which are not shown as they can be of conventional design and are not affected by the present invention.

If there were no visible light energy, infrared radiations from a 2,000° K. target would be recorded. However, if there are visible signals these pass through suitable optics (not shown), which are filtered to pass a band around .45μ. They strike one part of a balanced visible detector 8 and 9 which is marked VIS on the drawing. The output is then amplified in a preamplifier 10 and the detector and number of stages in the preamplifier are so chosen that the leading edge of a pulse of visible light will produce a negative pulse at the output of the preamplifier as is shown at the side of the circuit in the drawings. This again is differentiated exactly as in the case of the IR by the capacitor and resistor which bear the same numerals 4 and 5. The diode 16, however, is the reverse of the diode 6 and instead of suppressing negative pulses, suppresses positive pulses. The negative pulses then strike a shunt gate composed of two transistors 11 and 12. The first transistor serves as a phase inverter and the second is saturated by the resulting positive pulse which is shown adjacent to the schematic. In effect this so reduces the resistance of the transistor 12, which should be of a switching type, that the output from the circuits following the IR detector is shorted. In other words, the gate is closed. The values of the differentiating circuit and the circuit including the phase inverting transistor 11 are such that the gate closes for sufficient time to prevent small spurious transient responses in the IR network.

Figure 2:
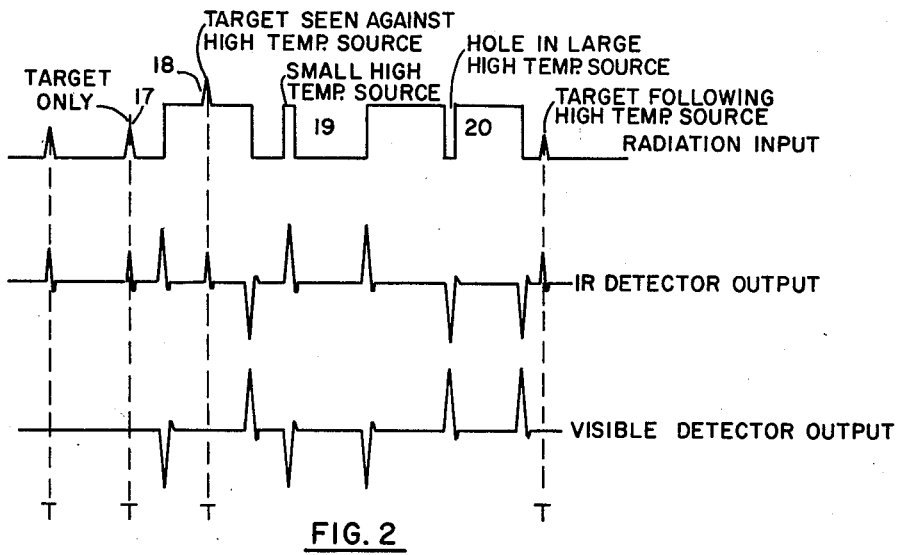
FIG. 2 shows the pulse shapes from FIG. 1 for various conditions.

The operation of the instrument can be seen in FIG. 2 where the waveshapes of radiation input and IR and visible detector outputs are represented, the latter two after differentiation. In the region 17 the 2,000° K. radiation only is shown. The region 18 corresponds to a large background of visible radiation with a small target. Relative amplitudes are not to scale. In the Shimukonis patent this would correspond to an airplane in a cloud. Region 19 corresponds to a small object radiating in the visible and region 20 corresponds to two larger objects radiating in the visible separated by a small space. This corresponds to a hole in a large cloud. In the region 17 the radiation pulses from the cooler target appear as positive pulses, negative pulses being suppressed by the diode 6. As the gate composed of the transistor 12 is open these pulses pass on as final output signal.

When there is a small target of 2,000° K. in a large expanse of visible background (region 18), the leading edge of the visible background will produce a positive pulse in the IR and a negative pulse in the visible detector output. However, the negative pulse in the latter closes the gate and so the positive pulse does not go through. The gate soon opens, for the width of its actuating pulse is fairly small, and then when the cooler target is seen there is a positive pulse in the IR output but no negative pulse in the visible output since there is no large change in visible radiation. This positive pulse then goes on through to the readout circuits. The trailing edge of the cloud produces a negative pulse in the IR detector output and a positive pulse in the visible detector output. But both of these are suppressed by the respective diodes and so nothing happens.

In the region 19 there is a small object radiating in the visible which produces a positive pulse in the IR output and a negative pulse in the visible detector output. The latter closes the gate so there is no response in the IR to reach the readout circuits.

Region 20 represents the situation corresponding to a hole in a large cloud. The leading ledge, as in the region 18, produces a positive pulse in the IR and a negative pulse in the visible and closes the gate so that no response is recorded. The hole or discontinuity in the cloud produces a negative pulse in the IR output and a positive pulse in the visible detector output both of which are suppressed by the respective diodes. Finally the trailing edge of the visible produces a negative pulse in the IR and a positive pulse in the visible detector which are again suppressed by the diodes. The gate still remains open so that a target closely following results in a positive pulse in the IR with no negative pulse in the visible and so is recorded.

Figure 3:
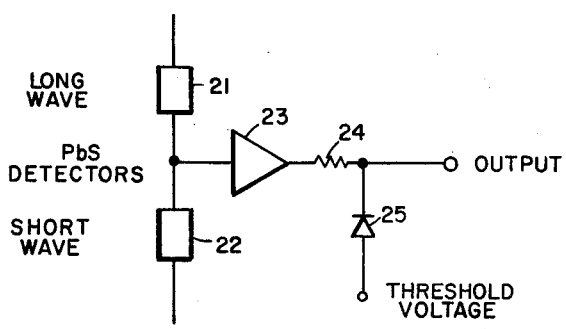
FIG. 3 is a diagrammatic illustration of a simplified modification where the sources are of comparable size.

When the visible source and the cooler IR source are both of comparable apparent size, for example both point sources, a somewhat simpler system can be used and this is shown in FIG. 3. An IR detector is shown diagrammatically at 21 and a visible detector at 22. They are connected in opposition and the differential output is amplified by the preamplifier 23 and enters a circuit containing an output load resistor 24 and a threshold clipping diode 25. Let us assume that polarity connection of the detectors is such that 21 produces a positive output and 22 a negative. If 21 only is energized with negligible signal from 22 the net result is positive, passes through the system and is recorded. If, however, there is sufficient visible light on detector 22 the net polarity is negative but this is discarded because the diode 25 shorts it out. The diode is biased by a threshold voltage at a point where conduction is desired. This is adjusted to a point where, with no 2,000° K. target, the visible target will produce sufficiently negative output to actuate the diode 25. There is still an on and off situation which is unaffected by differential attenuation of paths for the two radiations. However, it is necessary that the temperatures of the two sources be quite far removed otherwise there will be so much radiation from both sources in both detectors that some of the problems of the balancing systems will be encountered. Dealing in practical terms if the cooler body is at 2,000° K., good discrimination will not be effected unless the other source is above 4,000° K., for example 4500. However, where the necessary temperature difference is present the simplified circuits of FIG. 3 give satisfactory results.

An example where more than two sources of different radiation characteristics are involved might be the solution of the problem of detecting green stains on a moving white background but not responding to red or blue stains. In this case three detectors are provided with filters in the optics, one responding at 524 m$\mu$, another at 400 m$\mu$ and a third at 650 m$\mu$. Each is provided with an amplifier. The circuit from the 524 m$\mu$ detector also contains a shunt gate. The outputs of the 400 and 650 m$\mu$ amplifiers lead to an "or" circuit the output of which actuates the shunt gate just as the output of the visible detector actuated the shunt gate in FIGS. 1 and 2.

If white background is seen there will be a signal in the output of each of the detectors. The "or" circuit gives an output to the shunt gate and, therefore, there will be no final output signal from the 525 m$\mu$ detector processing circuits. If a red or orange stain passes there will be no signal in the 400 m$\mu$ detector but there will be in the 650 m$\mu$. The gate will, therefore, remain closed. Similarly in the case of a blue spot or stain there will be a signal from the 400 m$\mu$ detector and the gate will remained closed. However, when a green stain passes there is no signal from either the 400 m$\mu$ or 600 m$\mu$ detectors. Therefore, there will be no output from the "or" circuit, the gate opens and the signal from the 524 m$\mu$ detector passes to a suitable recording mechanism.

It will be noted that in the case of the three sources there is just as much an on and off switching as in the case of two sources. It in nowise depends on a balance of signal intensity. If there is no signal in the 400 or 650 m$\mu$ detectors above the threshold the gate will be opened. Changes in the absorption of the path to the detectors will have no effect just as is the case with sources of two-color temperatures. The same type of reliable and precise operation results.

I claim:
1. An instrument for the detection of radiations from at least two sources of different radiation frequency characteristics which comprises radiation detectors responding only to the average power of radiations, including the peak frequency radiations, from the different sources, the radiation detectors having time constants very large compared to arrival time intervals of the photons of the radiations, electronic processing circuits connected to the outputs from the detectors, the circuits from at least one detector receiving desired radiation source having gating means actuated from a predetermined combination of signals from at least one of the other detectors whereby a final output signal is produced when the desired radiation source is present.

2. An instrument for the detection of radiations from a source at a lower color temperature from that of one markedly higher color temperature which comprises a radiation detector responding to a wavelength band near the peak radiation of the source of lower color temperature, a second detector receiving a radiation band near the peak wavelength of the higher color temperature source, electronic amplifying circuits connected to the low color temperature detector and including differentiating means and means for suppression of pulses of one polarity, an output gate in said circuits, electronic circuits connected to the output of high color temperature detector said circuits including differentiating means and means for suppressing pulses of polarity opposite to that of the pulses suppressed in the circuits connected to the output of the low color temperature detector and connecting means from the output of the circuits to close the gate, whereby when there is present radiation striking both detectors there will be no response because the gate is closed and response will be obtained only when there is a change radiation striking the low color temperature detector without a change in radiation striking the high color temperature detector.

3. An instrument according to claim 2 in which the pulse suppression means are diodes.

4. An instrument for discriminating between low color temperature radiation sources and high color temperature radiation sources, the sources being of comparable apparent areas, which comprises a radiation detector receiving radiation near the peak wavelength for the low color temperature source and a radiation detector receiving radiations near the peak radiation for the high color temperature source, the detector being connected in opposition and adjustable electronic means for suppressing net detector output in the polarity corresponding to the high color temperature radiation.

5. An instrument according to claim 3 in which the adjustable means is an adjustably biased diode.

References Cited in the file of this patent
UNITED STATES PATENTS

| | | |
|---|---|---|
| 2,739,242 | Armistead | Mar. 20, 1956 |
| 2,837,738 | Valkenburgh | June 3, 1958 |
| 3,011,853 | Ilgenfritz | Dec. 5, 1961 |
| 3,012,148 | Snyder et al. | Dec. 5, 1961 |
| 3,031,576 | Loy | Apr. 24, 1962 |
| 3,050,633 | Loebner | Aug. 21, 1962 |